United States Patent [19]

Rowland

[11] Patent Number: 5,034,579

[45] Date of Patent: Jul. 23, 1991

[54] MOTION SENSOR

[75] Inventor: Barry F. Rowland, Vancouver, Canada

[73] Assignee: Michael De Champlain, Canada

[21] Appl. No.: 421,887

[22] Filed: Oct. 16, 1989

[51] Int. Cl.$^5$ ............................................. H01H 35/14
[52] U.S. Cl. ............................ 200/61.45 R; 200/61.52
[58] Field of Search ............... 200/61.45 R, 61.45 M,
200/61.48, 61.5, 61.52, 61.53; 340/540, 565,
566, 568, 571, 669

[56]  References Cited

U.S. PATENT DOCUMENTS

| | | | |
|---|---|---|---|
| 3,163,856 | 12/1964 | Kirby | 200/61.45 R X |
| 3,655,928 | 4/1972 | Engel | 200/61.45 R |
| 3,742,478 | 6/1973 | Johnson | 200/61.45 R X |
| 4,196,429 | 4/1980 | Davis | 200/61.45 R X |

Primary Examiner—J. R. Scott
Attorney, Agent, or Firm—Townsend and Townsend

[57] ABSTRACT

A motion sensor has a ball of electrically conductive material in an annular ball race around which the ball can travel in response to motion of the sensor and electrical contacts spaced apart from one another around the ball race for electrical contact with the ball during such travel. A circuit responsive to electrical contact of the ball with the contacts detects the travel of the ball and, thus, motion of the sensor and a device is provided for selectively retaining the ball in an inoperative position spaced from the contacts, whereby wear of the contacts by the ball is avoided while the sensor is in a correspondingly inoperative condition.

18 Claims, 4 Drawing Sheets

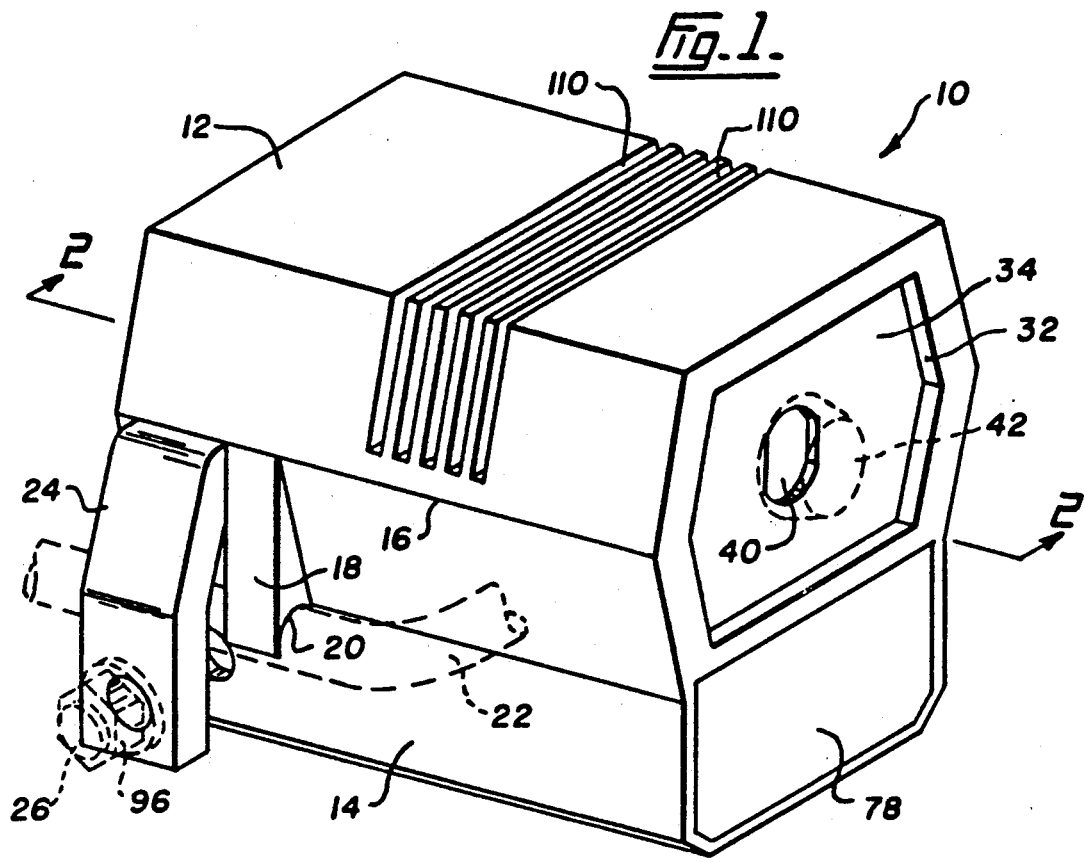
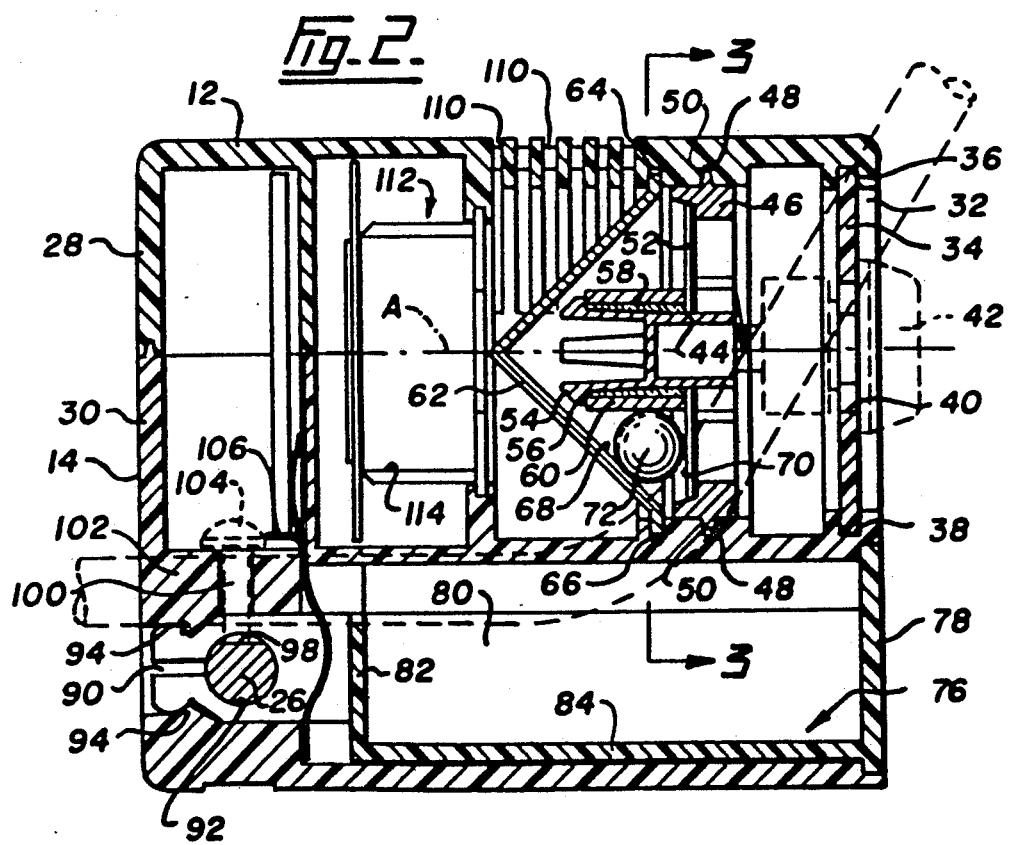

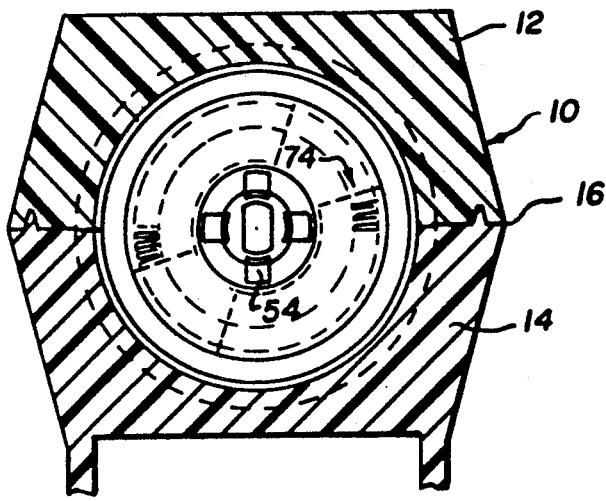
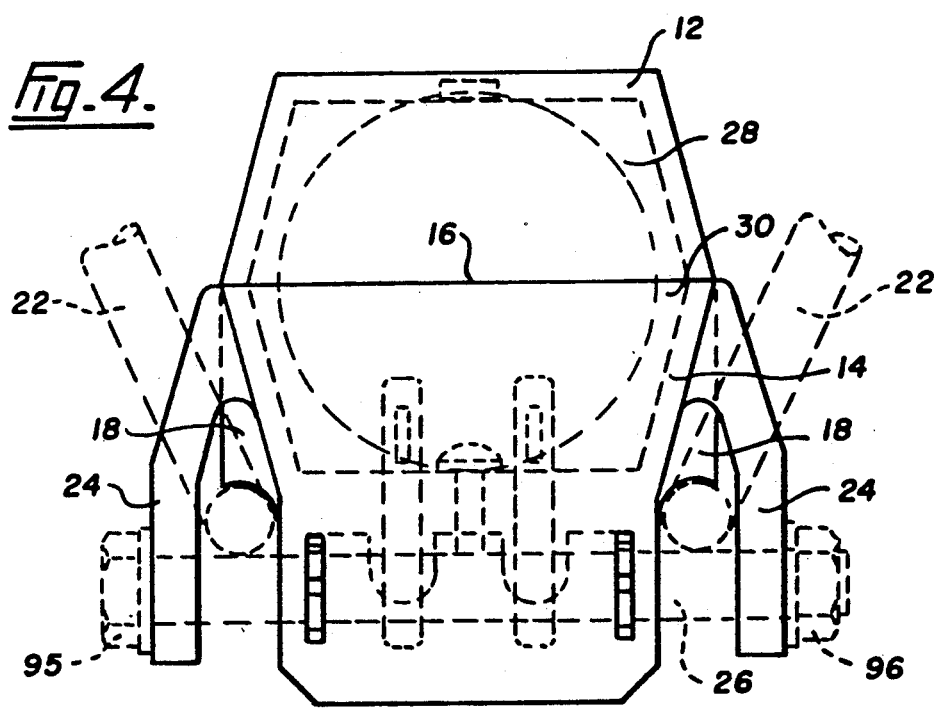
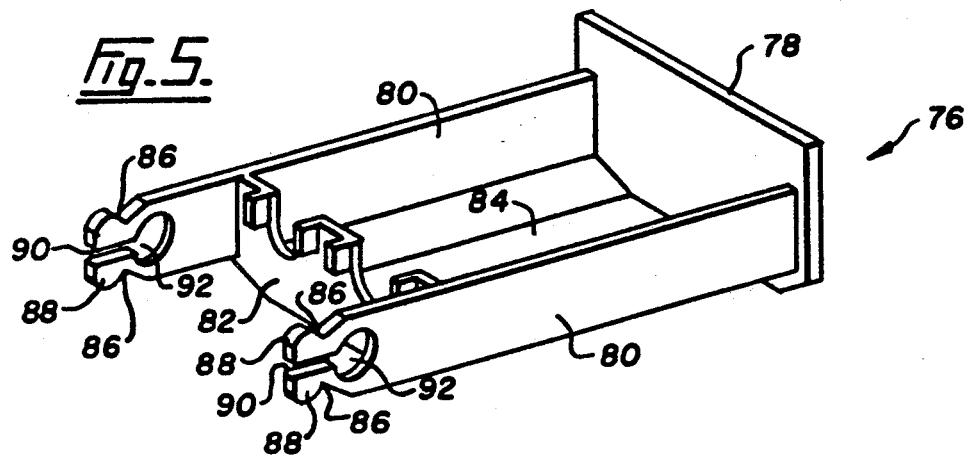

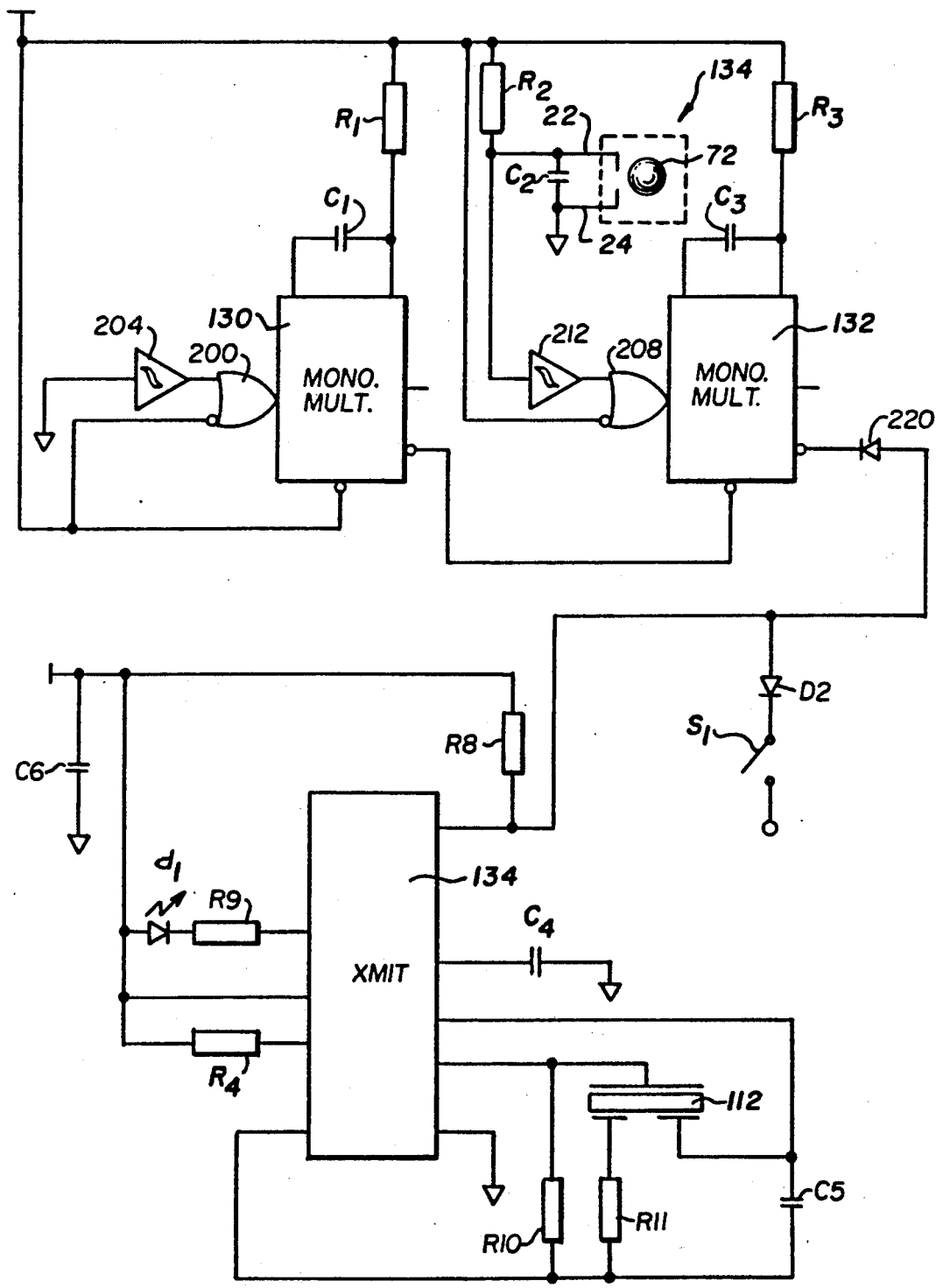
Fig. B.

MOTION SENSOR

FIELD OF THE INVENTION

The present invention relates to motion sensors, and, more particularly, to motion sensors of type comprising an electrically conductive ball which can travel around a ball race provided with electrical contacts which are bridged by the ball during such travel for detecting motion of the sensor.

The present motion sensor is useful, in particular, for anti-theft devices for bicycles, but may also be employed, for example, in anti-theft devices for use with skiing equipment, golfing equipment and portable sports equipment and further purposes.

Also, the present motion sensor may be manufactured as an intregal, i.e. built-in, part of an anti-theft device, or may alternatively be manufactured as a separate unit or module for subsequent incorporation into various types of alarm systems.

BACKGROUND OF THE INVENTION

Motion sensors of the type referred to above are, in general, already well known in the art.

However, it is a disadvantage of the prior art motion sensors of this type that the ball continues to roll around the ball race, in response to motion of the motion sensor, during period of time when the motion sensor is not in use.

Consequently, electrical contacts are subject to wear during such time periods and may therefore become prematurely worn.

BRIEF SUMMARY OF THE INVENTION

It is accordingly an object of the present invention to provide a novel and improved motion sensor of the abovementioned type, in which wear of the electrical contact by the ball while the sensor is inoperative can be entirely eliminated.

According to the present invention, there is provided a motion sensor which comprises a ball of electrical conductive material, means defining an annular ball race around which the ball can travel in response to motion of the sensor, means defining a plurality of electrical contacts spaced apart from one another around the ball race for contact with the ball during such travel, means responsive to electrical contact of the ball with the contacts for detecting travel of the ball and, thus, motion of the sensor, and means for selectively retaining the ball in an inoperative position, spaced from the contacts, whereby wear of the contacts by the ball is avoided while the sensor is in a correspondingly inoperative condition.

In a preferred embodiment of the invention, the ball race is defined by a flat plate, on which the electrical contacts are provided in an endless array, and by a conical member.

More particularly, the ball race is defined by a concave, conical rolling surface on the interior of the conical member and a flat rolling surface on the flat member.

By relative movement of the rolling surfaces in the axial direction of the conical member, the ball can be radially inwardly displaced, along the conical rolling surface, to displace the ball inwardly from the contact array.

Preferably, the motion sensor is provided with a resilient annular member extending axially of the conical member, the arrangement being such that, when the ball is displaced radially inwardly by relative axial movement of the conical member and the flat member, the ball becomes wedged against the resilient cylindrical member, and is thereby resiliently but securely retained in position.

BRIEF DESCRIPTION OF THE DRAWINGS

Further objects, features and advantages of the present invention will appear from the following description thereof when taken in conjunction with the accompanying drawings, in which:

FIG. 1 shows a view in pespective of a bicycle anti-theft device incorporating a motion sensor according to the present invention;

FIG. 2 shows a view in longitudinal cross-section through the device of FIG. 1, taken along the line 2—2 of FIG. 1;

FIG. 3 shows a view in transverse section through the device taken along the line 3—3 of FIG. 2;

FIG. 4 shows a view in end elevation of the device of FIGS. 1 through 3;

FIG. 5 shows a view in perspective of a battery tray forming part of the device of FIGS. 1 through 4;

FIG. 8 shows the electrical circuit diagram of the device of FIGS. 1 through 4.

DESCRIPTION OF THE PREFERRED EMBODIMENTS

Figure 7:
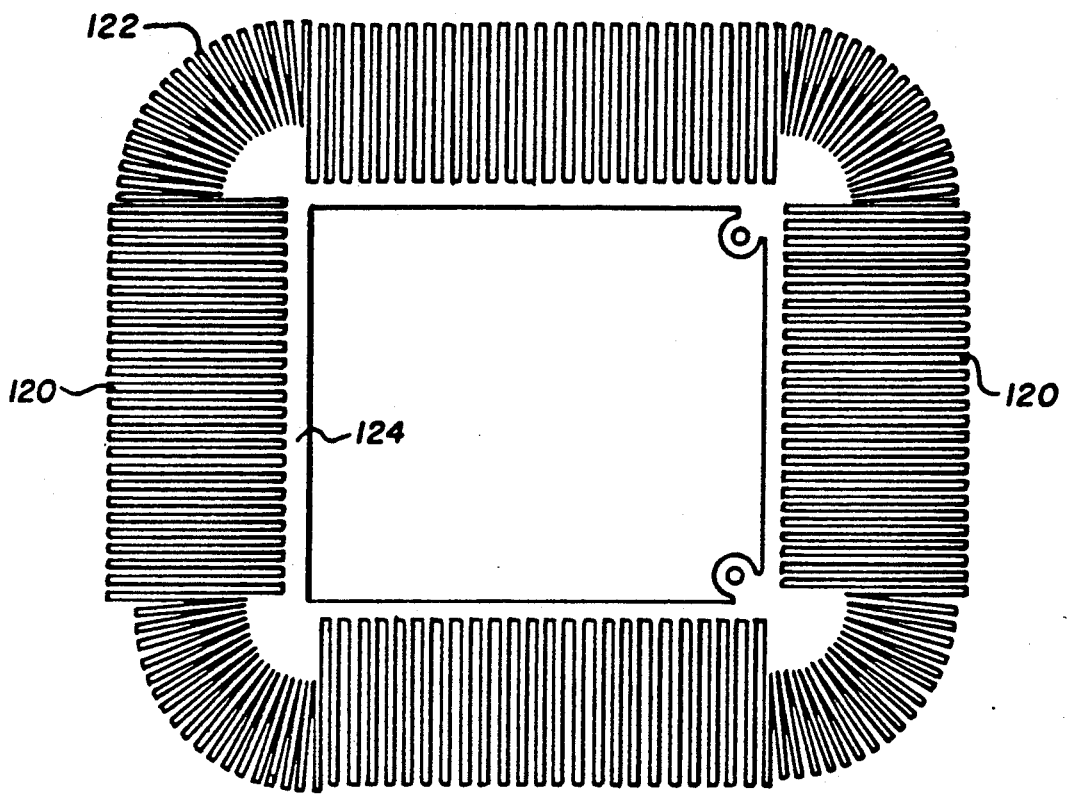
FIG. 7 shows another form of contact array for use in the device of FIGS. 1 through 4.

Referring now to the accompanying drawings and, in particular, to FIG. 1, reference numeral 10 indicates generally an anti-theft device for use on a bicycle.

The anti-theft device 10 comprises a housing formed by an upper housing portion 12 and a lower housing portion 14, which are made of plastics material and which are welded to one another along a joint line 16.

The lower housing portion 14 has, at each side thereof, a first projection 18 which projects laterally from the housing 10 and which is formed with a cylindrically concave underside 20, which is shaped to seat snugly on a respective one of a pair of cylindrical seat rails 22.

The lower housing portion 14 is also formed, adjacent the first projections 18, with a pair of second projections in the form of laterally outwardly and downwardly depending arms 24, through which extends a bolt 26 which secures the entire anti-theft device 10 to the seat rails 22 in a tamper-proof manner, as described in greater detail below. For the present, it is simply pointed out that the bolt 26 extends beneath the seat rails 22.

The housing upper portion 12 has a rear wall 28 formed in one piece therewith, which is connected along the weld join line 16 to a rear wall 30 intregal with the lower housing portion 14.

In this way, the rear end of the interior of the housing is closed by the walls 28 and 30.

The front ends of the upper housing portion 12 and the lower housing portion 14 form a front opening 32, which is closed by a hexagonal closure plate 34, the periphery of which is received in recesses 36 and 38 formed in the upper and lower housing portions 12 and 14.

The closure plate 34 is formed with a circular opening 40, through which extends a lock 42.

Within the interior of the housing, the lock 42 is connected to a hub portion 44 forming part of a component mechanism which has a solid annular rim 46 extending around and spaced from the hub portion 44, and a pair of helically-shaped, radially outwardly extending flanges 48, which slidably engage in correspondingly helically shaped internal recesses 50 formed in the inner sides of the housing portions 12 and 14.

The arrangement is such that, upon insertion of a key (not shown) into the lock 42, and rotation of the key, the hub portion 44 and, therewith, the rim portion 46 and the helical flanges 48 are rotated, so that by the interengagement of the helical flanges 48 and the helical recess 50, the rim portion 46 and the hub portion 44 are displaced axially, along an axis A.

The hub portion 44 carries a disc member 52, the outer periphery of which is engaged in the rim portion 46.

This disc member 52 is a printed circuit board, on which an endless array of electrical contacts is printed, as described in greater detail below.

Four radially spaced prongs 54, projecting longitudinally from the inner end of the hub portion 44 and formed at their free ends with retaining shoulders 56, serve to retain cylindrical members 58 and 60 on the hub portion 44 and the fingers 54.

The fingers 54 with their cylindrical members 58 and 60 project into a conical member 62. An annular peripheral flange 64 on the conical member 62 engages in a corresponding annular recess 66 formed on the interiors of the upper and lower housing portions 12 and 14 for retaining the conical member 62 in position with the axis of the conical member coincident with the axis A.

The conical member 62 has an internal surface 68, a frusto-conical surface portion of which, together with an annular surface portion 70 of the disc member 52, forms a ball race for an electrically conductive ball 72.

An electrical conductor array 74 (FIG. 3) is formed around a peripheral portion of the annular surface 70, and the conical member 62 is made of electrically conductive material so that, when the device is in an operative condition, as described below, the ball 72 forms an electrically conductive bridge between the contact array 74 and the conical member 62.

In the condition shown in FIG. 2, the device is in an inoperative position, in which the disc member 52 has been displaced towards the conical member 62, by actuation of the lock 42, along the axis A. The ball 72 is thus displaced radially inwardly relative to the axis A, into an inoperative position in which the ball 72, at the point of which it makes contact with the annular member 52, is displaced radially inwardly from the contact array 74.

In this inoperative position of the ball 72, the ball 72 is urged against the outer cylinder core member 60 on the hub portion 44 and the fingers 54. This cylindrical portion 60 is made of resilient material, so that the ball is resiliently but securely held in the position in which it is shown in FIG. 2.

When, however, by actuation of the lock 42 by its key, and by consequential rotation of the helical flanges 48 in their recesses 50 and, thus, the displacement of the hub portion 44 and, therewith, the disc member 52 to the right, as viewed in FIG. 2, along the axis A, the ball 72 can roll downwardly from the position in which it is shown in FIG. 2 towards the peripheries of the conical member 62 and the disc member 52, until it makes electrical contact with the contact array 74. The anti-theft device 10 is then in an operative condition, and acts as an alarm device, in response to motion, as described in greater detail below.

The lower housing portion 14 contains a tray, which is indicated generally by reference numeral 76 in FIG. 5, and which is formed with a front wall 78, a pair of side walls 80, a rear wall 82 and a bottom 84.

The rear ends of the rear walls 80 are formed, at the top and bottom thereof, with notches 86 and end portions 88 of the reduced height, the end portions 88 of each wall 80 being separated by a horizontally extending slot 90 extending into a circular opening 92.

With this arrangement, when the tray is slid rearwardly into the lower housing portion 14, the end portions 88 of each wall 80 are pushed between a pair of mutually opposed projections 94 formed on the interior of the lower housing portion 14 at the rear thereof. In this way, the two end portions 88 of each wall 80 are pressed together resiliently as they pass between the projections 94, these end portions 88 then spring apart from one another so that the projections 94 are engaged in the notches 86, as shown in FIG. 2.

The bolt 26 is then inserted through the arms 24 and, thereby through the circular openings 92 in the walls 80 so as to retain the battery tray 76 in the lower housing portion 14, the bolt 26 being retained by a head 95 at one end and a nut 96 at the other end.

The bolt 26 is formed, at its midpoint, with a flat 98, onto which drops the lower end of an actuating pin 100, the bolt 26 being rotated into an appropriate position, in which it is shown in FIG. 2, for this purpose.

The actuating pin 100 is vertically slidably received in an intregal, inwardly projecting ledge 102 forming part of the lower housing portion 14 and extending inwardly thereof from the rear wall 30.

The actuating pin 100 has a head 104, which engages a contact member 106.

The purpose of the actuating member 100 and its contact member 106 is to initiate operation of an alarm circuit, described below, in the event that an unauthorized person attempts to tamper with the anti-theft device 10 by rotating the bolt 26 in order to release the anti-theft device 10 from its bicycle.

As can be seen from FIGS. 1 and 2, the upper housing portion 12 is formed with a plurality of parallel slots 110, through which the interior of the housing communicates with the exterior atmosphere.

Referring to FIG. 2, it will be seen that these slots 110 are located radially outwardly of the conical member 62.

The housing also contains an electro-acoustic transducer indicated generally by reference numeral 112 and having a cavity 114 facing towards the conical member 62 which is coaxial with and tapers towards the transducer 112 and which, together with the transducer cavity 114, forms a Helmholz resonator for the sound vibrations produced by the transducer 112. The resultant sound, serving as an alarm signal, is broadcast through the slots 110.

Figure 6:
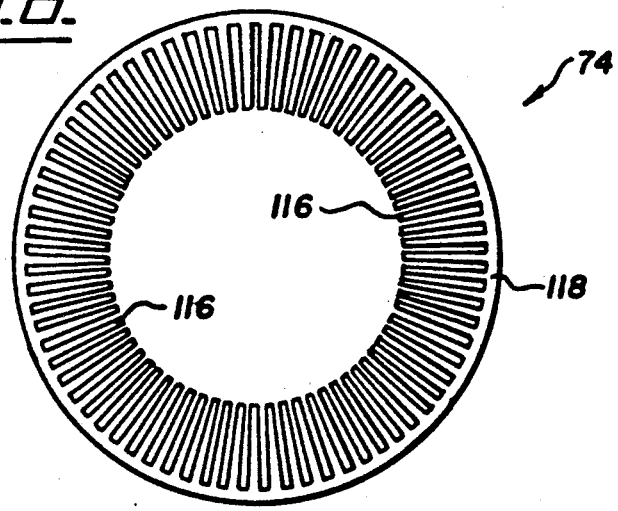
FIG. 6 shows one form of electrical contact array for use in the device of FIGS. 1 through 4.

FIG. 6 shows a diagrammatic illustration of the annular contact array 74. As can be seen from FIG. 6, this array comprises a plurality of radially extending, equiangularly spaced contact strips 116 connected by a common annular conductor 118.

With such an array, as the ball 72 rolls around the array, in response to motion of the anti-theft device 10, the ball successively makes contact with the contact strips 116 and with the areas of the electrically-insulating board forming the disc member 52.

Since the ball 72 is also simultaneously rolling on the electrically conductive conical member 62, the ball, during its rolling motion around the annular array, successively and repeatedly makes and breaks an electrical connection between the annular contact strip array 74 and the electrically conductive conical member 62. Corresponding electrical pulses produced in this way are used to initiate the emission of the audible alarm signal by the transducer 112, as described in greater detail below.

FIG. 7 shows a modified form of conductor strip array in which, instead of comprising an annular array of conductor strips as shown in FIG. 6, is composed instead of a generally square array of conductor strips 120 and 122, the conductor strips 122 being provided at the four corners of the array and the conductor strips 120 being provided between the corners of the array. A common, square conductor strip 124 interconnects the conductor strips 120 and 122. In this case, the conical member 62 is replaced by hollow, convergent member of generally square cross-section, with rounded corners, corresponding to the conductor array.

With this modified conductor array arrangement, the device exhibits a greater sensitivity to motion when the ball is located between the corners of the array than when the ball is at one of these corners. This arrangement may be utilized, for example, to provide greater sensitivity of the motion conductor when the bicycle is in the normal position in which it is left unattended, e.g. in an upright condition.

The conductor array may have a shape other than the annular and square shapes referred to above, e.g. a triangular array or a non-symmetrical shape. In each case other than the annular shape, the radius of curvature of the rolling path of the ball 72 varies, around the path, in accordance with the shape of the conductor array, and the angle between the conductor strip correspondingly varies. Thus, the sensitivity of the device to movement is correspondingly varied around the path.

The sensitivity may also be varied around the path by varying the lateral spacings of the conductor strips.

In addition, it has been found that the height or thickness of the conductor strips, in a direction perpendicular to the board on which they are provided, affects the hysteresis of the initial ball motion in response to motion of the sensor device. Thus, the greater the strip thickness is, then the greater is the ball motion hysteresis.

As shown in FIG. 8, the electronic circuit for controlling the above-described anti-theft device comprises a first monostable multivibrator 130, implemented by a 4538B integrated circuit device which serves to provide a delay time when power is first applied to the circuit in order to allow the motion sensor to stabilize. Thus, motion of the bicycle for this period of time, following the activation of the antitheft device by the user, resulting e.g. from adjustments to the position of the bicycle before the user leaves the bicycle, are prevented from initiating an alarm signal.

The first monostable multivibrator 130 is provided with a resistor r1 and capacitor c1 the value of which determines the length of the time delay. Inputs are provided to monostable multivibrator 130 through an OR gate 200 having a Schmitt trigger input 204.

A second monostable 132, likewise implemented by the 4538B device, is provided with a resistor r2 and a capacitor c2, the value of which determine a time constant for a rising edge of a pulse applied to the second monostable 132 by the motion sensor, indicated generally by reference numeral 134, as the ball 72 rolls over the contact array as described above. This time constant determines the time that the sensor contacts must be open before the voltage at the input of the monostable 132 rises to the trigger point of the monostable 132. The longer this time constant is, the less sensitive the device will be to short jolts and vibration and to rapid rotation of the motion sensor.

A resistor r3 and capacitor c3 connected to the second monostable 132 determine the time period of the alarm signal. Inputs are provided to monostable multivibrator 132 through an OR gate 208 having a Schmitt trigger input 212.

The output of the second monostable 132 is applied to the sense pin of integrated circuit transmitter device 134 Motorola Part No. (MC14467) through a diode 220. The sense pin is also coupled to a resistor R8. The alarm is triggered when this output goes low, the integrated circuit device 134 driving the transducer 112 using resistor R10, R11 and capacitor C5 to provide the alarm and to indicate when the battery is low A light emitting diode d1 and resistor R9 provide a load for battery testing and gives a visible indication that the alarm is armed. Power is supplied to diode d1 and the remainder of the device using a capacitor C6.

Resistor r4 and capacitor c4 determine the cycle time of the alarm.

Switch contact s1, connected through diode d2 to the integrated circuit device 134, is activated by the pin 100 to provide a warning of tampering of the device as described above.

I claim:

1. A motion sensor, comprising:
a ball of electrically conductive material;
means for retaining said ball;
said ball retaining means including means defining an endless path around which said ball can travel in response to motion of said sensor;
means for detecting movement of said ball around said path of travel and, thus, the motion of said sensor;
said movement detecting means including means defining a plurality of electrical contacts spaced apart from one another around said path of travel for electrical contact with said ball; means for providing an output signal in response to electrical contact of said ball with successive ones of said contacts as said ball moves around said path and means responsive to said output signal for providing an indication of said ball movement; and
selectively adjustable means for displacing said ball from said path of travel to an inoperative position, in which said ball is displaced from said contacts, whereby said motion sensor is made inoperative, and wear of said contacts by said ball is avoided while said ball is in its inoperative position.

2. A motion sensor as claimed in claim 1 wherein said electrical contacts comprise a plurality of contact strips arranged in an endless array and extending in the radial direction of said ball race.

3. A motion sensor as claimed in claim 1, wherein said contacts are spaced laterally of one another by spacings which vary around said endless path to correspondingly vary the sensitivity of said motion sensor to displacement of said ball around said endless path.

4. A motion sensor as claimed in claim 3, wherein said contacts are arranged in a generally square array, said contact spacings being smaller at corner regions of said contact array than between said corner regions.

5. A motion sensor as claimed in claim 1, wherein said endless path defining means comprise first and second rolling surfaces spaced apart from one another with said ball located between said rolling surfaces for rolling on said surfaces around said endless path, said first rolling surface being electrically conductive and said electrical contacts being spaced apart from one another on said second rolling surface, said means for providing an output signal including means for sensing electrical bridging by said ball between said first rolling surface and successive ones of said electrical contacts as said ball rolls around said endless path.

6. A motion sensor as claimed in claim 5, further comprising lock and key means for selectively actuating said ball displacing means and thereby rendering said motion sensor inoperative.

7. A motion sensor as claimed in claim 6, wherein said ball displacing means comprise helical screw means for effecting the relative axial displacement of said rolling surfaces in response to rotational actuation of said helical screw means by said lock and key means.

8. A motion sensor as claimed in claim 1, wherein said endless path defining means comprise a concave, frusto-conical first rolling surface and a second rolling surface facing said rolling first surface with said ball being located between said first and second rolling surfaces for rolling on said surfaces around said endless path, said selectively adjustable means comprising means for effecting relative displacement of said first and second rolling surfaces to correspondingly displacement said ball from said electrical contacts into its inoperative position by urging said ball along said frusto-conical surface.

9. A motion sensor as claimed in claim 8, further comprising resilient means extending axially of said frusto-conical surface for resiliently retaining said ball in a stationary condition upon displacement of said ball into an inoperative position.

10. A motion sensor as claimed in claim 1, wherein said selectively adjustable means for displacing said ball into said inoperative position comprise means for holding said ball stationary in said inoperative condition.

11. A motion sensor as claimed in claim 10, wherein said endless path defining means comprise a concave, frusto-conical first rolling surface and a second rolling surface facing said first rolling surface with said ball being located between said first and second rolling surfaces for rolling on said surfaces around said endless path, an abutment being provided axially of said frusto-conical surface, said selectively adjustable means comprising means for effecting relative displacement of said first and second rolling surfaces to correspondingly displace said ball from said electrical contacts into its inoperative position by urging said ball along said frusto-conical surface into wedged engagement with said abutment.

12. A motion sensor for providing an audible warning of movement of an object, comprising:
a ball of electrically conductive material;
means for retaining said ball;
said ball retaining means including means defining an endless path around which said ball can travel in response to motion of said sensor;
means for detecting movement of said ball around said path of travel and, thus, the motion of said sensor;
said movement detecting means including means defining a plurality of electrical contacts spaced apart from one another around said path of travel for electrical contact with said ball; means for providing an output signal in response to electrical contact of said ball with successive ones of said contacts as said ball moves around said path and audible alarm means responsive to said output signal for providing an audible warning of said ball movement;
selectively adjustable means for displacing said ball from said path of travel to an inoperative position, in which said ball is displaced from said contacts, whereby said motion sensor is made inoperative, and wear of said contacts by said ball is avoided while said ball is in its inoperative position;
tamper-resistant housing means for enclosing said ball retaining means, said movement detecting means and said ball displacing means; and
tamper-resistant means for securing said housing to said object.

13. A motion sensor as claimed in claim 12, wherein said path defining means comprise an electrically conductive first surface and an electrically insulating second surface, said contacts being provided on said second surface and said first and second surfaces being spaced apart from one another to receive said ball therebetween with said ball rolling in contact therewith, whereby said ball electrically bridges said first surface and successive ones of said contacts during the travel of said ball around said endless path, said output signal providing means comprising means responsive to the electrical bridging of said first surface and said contacts by said ball.

14. A motion sensor as claimed in claim 13 wherein one of said first and second surfaces is frusto-conical and the other of said first and second surfaces faces said frusto-conical surface, said surfaces being relatively displaceable axially of said frusto-conical surface by said selectively adjustable means to displace said ball along said frusto-conical surface and, thereby into said inoperative position.

15. A motion sensor as claimed in claim 14, wherein said selectively adjustable means comprise lock and key means for effecting and reversing the relative displacement of said surfaces.

16. A motion sensor as claimed in claim 12, wherein the spacings of said contacts are varied around said endless path to correspondingly vary the sensitivity of said sensor to movement of said ball at different locations around said path.

17. A motion sensor is claimed in claim 12, wherein said selectively adjustable means include lock and key means for effecting the displacement of said ball between an operative position, in which said ball can roll over said electrical contacts, and said inoperative position.

18. A motion sensor as claimed in claim 12, further comprising battery means for energizing said motion sensor, means defining within said housing means a compartment for receiving said battery means and means for retaining said battery means in said compartment, said housing securing means comprising means for securing said retaining means against tampering.

* * * * *